United States Patent [19]

Leff et al.

[11] Patent Number: 4,954,083
[45] Date of Patent: Sep. 4, 1990

[54] COMMUNICATION AID

[76] Inventors: Ruth B. Leff; Aaron N. Leff, both of 6589 N. Crestwood Dr., Glendale, Wis. 53209

[21] Appl. No.: 394,965

[22] Filed: Aug. 17, 1989

[51] Int. Cl.⁵ .......................................... G09B 21/00
[52] U.S. Cl. ..................................... 434/112; 40/611
[58] Field of Search ............... 434/112, 156, 159, 170, 434/236; 40/606, 584, 600, 611, 618, 619, 620, 489, 490, 591, 595, 593, 661

[56] References Cited

U.S. PATENT DOCUMENTS

| | | | |
|---|---|---|---|
| 962,630 | 6/1910 | Francis | 40/620 |
| 1,106,340 | 8/1914 | Bellamy | 40/595 |
| 1,299,353 | 4/1919 | Kaber | 40/595 |
| 1,772,697 | 8/1930 | Backmyer | 40/595 |
| 2,528,827 | 11/1950 | Harrison | 40/595 |
| 3,651,512 | 3/1972 | Summers | 434/112 X |
| 3,818,448 | 6/1974 | Wilkins | 434/112 X |
| 4,204,341 | 5/1980 | Nowak | 35/1 |
| 4,306,368 | 12/1981 | Coghill et al. | 434/112 X |
| 4,333,092 | 6/1982 | Field | 434/112 X |
| 4,339,886 | 7/1982 | Griffiths et al. | 40/595 |
| 4,742,633 | 5/1988 | Snediker | 40/611 X |
| 4,761,633 | 8/1988 | Leff et al. | 434/112 X |
| 4,795,348 | 1/1989 | Garthwaite | 434/112 |

FOREIGN PATENT DOCUMENTS 0061146  9/1982  European Pat. Off. ............ 434/112

OTHER PUBLICATIONS

"Communication Aids For Children and Adults", The Crestwood Company, Fall 1984 Catalog, p. 8.
"Augmentative Communication Materials", Imaginart Communication Products, 1985-1986 Catalog, p. 4.

*Primary Examiner*—Richard J. Apley
*Assistant Examiner*—Jennifer L. Doyle
*Attorney, Agent, or Firm*—Andrus, Sceales, Starke & Sawall

[57] ABSTRACT

A communication aid for a handicapped patient having only eye movement. The aid comprises a rigid transparent panel having a central opening therein and a plurality of transparent overlays each having a central aperture are individually mounted flatwise on the panel with the aperture in the overlay aligned with the opening. Each overlay contains a plurality of illustrations depicting objects or needs of the patient and the illustrations are spaced around the central aperture. An observer looking through the aligned aperture and opening can observe the eye movement of the patient and determine the illustration at which the patient is looking. The overlays are provided with identification indicia, such as a colored margin, with the color on each overlay being different than the color on other overlays, so that each overlay can be readily identified by the patient.

15 Claims, 1 Drawing Sheet

COMMUNICATION AID

BACKGROUND OF THE INVENTION

A severely handicapped person, who has no control over his or her limbs or head, has great difficulty in expressing everyday needs. Frequently, a severely handicapped person of this type has control of the eyes and, therefore communication aids have been proposed in which movement of the patient's eyes can be used to determine needs or to transmit a message.

One communication aid of this type comprises a transparent rigid panel having a central opening, and a series of illustrations or other indicia, are spaced around. the central opening and depict various objects or needs of the patient. An operator, holding the panel before a patient, looks through the central opening and follows the eye movement of the patient as the patient's eyes move toward one of the illustrations. Through this method, the observer is able to determine the illustration and thus the need of the patient.

While communication aids of this type have been very successful, they are somewhat limited in the number of illustratations that can be positioned around the central opening. If too many illustrations are utilized, it is difficult for the observer to zero in on the illustration or other indicia at which the patient is looking. Further, it is frustrating to the patient when the operator is unable to readily comprehend the need or desire. Moreover, a handicapped person having only eye movement may be mentally alert and may desire an expanded vocabulary over that which is available in conventional communication aids.

SUMMARY OF THE INVENTION

The invention is directed to an improved communication aid in which eye movement of the patient is utilized to express a need or transmit a message.

More particularly, the communication aid comprises a rigid transparent panel or board having a central opening therein. A plurality of transparent overlay sheets, each having a central aperture can be individually mounted flatwise against one surface of the panel, with the aperture in the overlay aligned with the opening in the panel.

Each overlay includes a plurality of indicia or symbols, such as illustrations of objects, words, numbers, or the like. The indicia on each overlay are different from those on other overlays. In addition, each overlay is provided with identification indicia, which in the preferred form of the invention, comprises a colored area, such as a colored margin. The colored margin on each overlay is different from the colored margins on other overlays. The panel or board also contains isolated or spaced patches of colors corresponding to the colors on the overlays. For example, a dot of color corresponding to the color of each overlay can be located at each corner of the panel.

In use, the operator initially places the panel without an overlay in front of the patient's face, either holding the panel or mounting the panel in a fixed support. The patient, by eye movement, will look to the colored dot or patch on the panel which corresponds to the overlay that he/she wishes to be mounted on the panel. The operator then places the panel bearing the desired overlay in front of the patient's face and the patient will then move his/her eyes toward the symbol that depicts the desired object or need and the operator, following the eye movement of the patient, can then determine the need of the patient.

The symbols on the overlays can take various forms. For example, one overlay may contain illustrations of food products, a second overlay may include illustrations of articles of clothing, a third overlay may include illustrations of personal items, etc. In addition, the overlays can include words, letters of the alphabet, or numerals.

Through use of the communication aid of the invention, a severely handicapped person, through movement of the eyes is able to communicate and express needs, or transmit a message, to an operator.

Other objects and advantages will appear in the course of the following description.

DESCRIPTION OF THE DRAWINGS

The drawings illustrate the best mode presently contemplated of carrying out the invention.

In the drawings.

DESCRIPTION OF THE ILLUSTRATED EMBODIMENT

Figure 1:
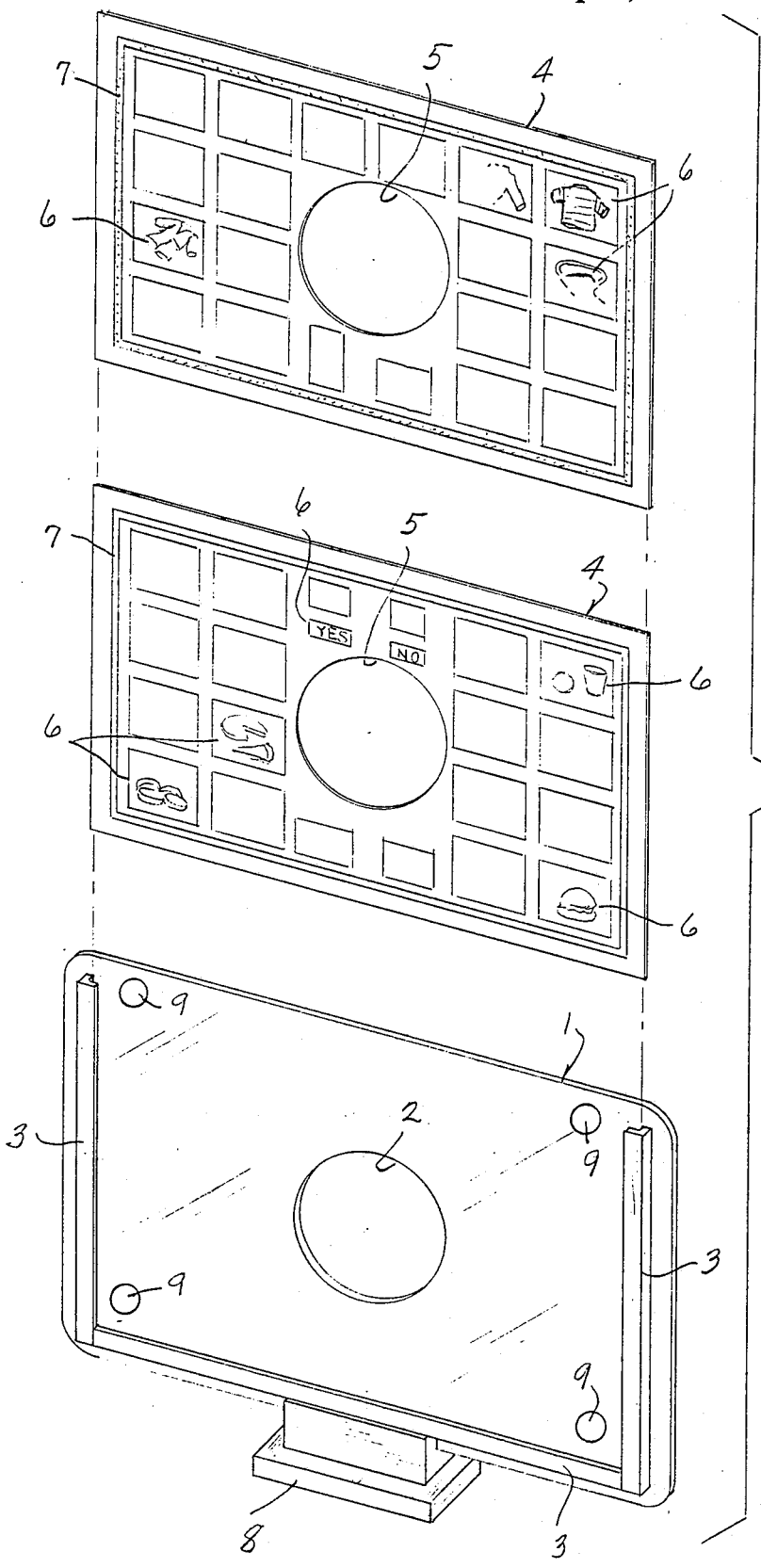
FIG. 1 is a an exploded perspective view showing a panel and a pair of overlays.

The drawings illustrate a communication aid for a severely handicapped person and has particular application for use with a person having eye movement, but no movement of the limbs or head.

The communication aid includes a rigid transparent panel or board 1 having a central opening 2 therein. A generally U-shaped mounting track 3 is disposed on one surface of panel 1 and a plurality of transparent overlay sheets 4 are adapted to be individually mounted in the mounting track. With an overlay sheet 4 mounted in track 3, the sheet will be generally flat against a surface of the panel and a central aperture 5 in sheet 4 will be aligned with opening 2 in pahel 1.

Each sheet 4 carries a plurality of symbols or indicia indicated by 6 which are spaced around the aperture 5 in the sheet. The indicia 6 on one sheet are different from the indicia on other sheets. While the drawings show only a pair of overlay sheets 4, it is contemplated that any number of sheets can be utilized.

As an example symbols or indicia 6 on one sheet 4 can be drawings or illustrations of a series of food products, such as milk, sandwich, apple, etc., while a second sheet may include illustrations of a series of items of clothing such as bathrobe, slippers, sweater, etc. Other sheets 4 may bear illustrations of personal needs, such as glasses, comb, pill box, etc.

In other instances the sheets 4 may contain letters of the alphabet, so that the patient using the communication aid can spell out a message, while in other instances the symbols 6 can be numerals.

In order for the patient to identify the various overlay sheets for use, identification indicia is applied to each sheet. In the preferred form of the invention, the identification indicia takes the form of a colored area, such as a colored margin 7, which extends around the periphery of each overlay sheet. The color of each margin 7 on each sheet is different from the color on other sheets, so that the sheets can be readily identified by the patient. As an example, one sheet 4 may bear a green colored margin, a second sheet may have a red colored margin, and a third sheet may have a blue colored margin. In order for the patient to readily identify the sheet or overlay 4 that he/she wishes to have mounted on panel 1, an identification code is utilized in which indicia corresponding to the indicia on sheets 4 is placed in isolated relation on panel 1. For example, if sheets 4 bear colored areas or margins, similar colors would be applied to panel 1 at spaced locations, such as the corners of the panel, as indicated by 9, in FIG. 1. If, as indicated above, individual sheets bear red, green and blue margins, red green and blue dots or patches 9 are placed on panel 1.

Figure 2:
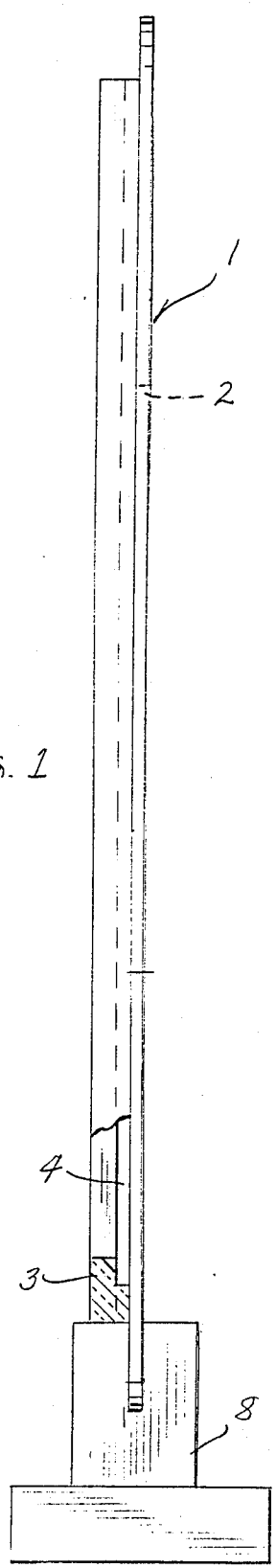
FIG. 2 is a vertical section showing the mounting of an overlay on the panel.

In use, the operator will initially position the panel, without an overlay sheet 4, in front of the patient's face, so that the operator can view the patient's face through the opening 2. The operator can either manually hold the panel in front of the patient, or alternately, the panel can be mounted in an upright position by inserting the lower edge of the panel in a fixed support 8, as shown in FIG. 2. It is also contemplated that the panel can be supported at the desired height via a floor stand.

The patient, by eye movement, will look to the colored area 9 that corresponds to the sheet 4 that he/she desires to have mounted on panel 1.

The operator then mounts the desired sheet 4 on panel 1 and views the patient's face through the aligned aperture 5 and opening 2. The patient will then move his/her eyes toward the symbol 6 that depicts the desired object or need, and the operator, by following the patient's eye movement can thus determine the object or need.

The use of the openings 2 and 5 is a preferred feature of the invention, for it facilitates viewing of the eye movement of the patient. While it is contemplated that the aligned viewing areas of panel 1 and overlay 4 could be transparent areas, as opposed to openings, the transparent areas could tend to produce reflections or distortions which could interfere with vision.

It is preferred that panel 1 and sheets 4 be formed of transparent material so that the symbols 6 on sheet 4 can be seen through the transparent sheet and transparent panel by the observer. Alternately, the sheets 4 can be formed of opaque material and identical symbols 6 can be applied to both faces of the sheet.

With the communication aid of the invention and the use of the various overlays, it is possible for a patient to readily communicate needs or messages without confusion or frustration.

Through use of several or more sheets 4 the vocabulary of the patient can be greatly 4expanded as compared to eye-responsive communication devices used in the past.

Various modes of carrying out the invention are contemplated as being within the scope of the following claims particularly pointing out and distinctly claiming the subject matter which is regarded as the invention.

We claim:

1. A communication aid for a handicapped patient, comprising a rigid panel, a plurality of overlay sheets, means for individually and removably mounting each overlay sheet flatwise against a surface of said panel, said panel and said sheets having aligned central viewing areas constructed an arranged so that an observer on one side of the panel can see a patient on the other side of said panel, a plurality of symbols fixed to each sheet and circumferentially spaced around the central viewing area of each sheet, the symbols on one sheet being different than the symbols on the other sheets, wherein with a sheet mounted on said panel an observer looking through the aligned viewing area can follow the eyes of the patient to determine the symbol at which the patient's eyes are directed.

2. The communication aid of claim 1, and including identification indicia on each sheet, the identification indicia on each sheet being separate from the symbols on said sheet and the identification indicia on each sheet being different from identification indicia on other sheets.

3. The communication aid of claim 1, wherein each sheet is made of transparent material.

4. The communication aid of claim 2, wherein said identification indicia comprises a colored zone on each sheet, the colored zone on each sheet being of a different color than the colored zones on the other sheets.

5. The communication aid of claim 4, wherein the colored zone comprises a colored border on each sheet.

6. The communication aid of claim 5, and including second indicia disposed in spaced relation on said panel, said second indicia corresponding to the identification indicia on said sheets.

7. The communication aid of claim 6, wherein said identification indicia comprises a colored zone on each sheet, the colored zone on each sheet being of a different color than the colored zone on other sheets, said second indicia comprising colored areas on said panel with the colored areas being of the same colors as the colored zones on said sheets.

8. A communication aid for a handicapped patient, comprising a rigid transparent panel having a central opening therein, a plurality of transparent overlay sheets each having a central aperture therein, mounting means on said panel for individually mounting each sheet in generally flatwise relation to the panel with said aperture being aligned with said opening, a plurality of symbols disposed on said sheet around said aperture, and identification indicia on each sheet, the indicia of each sheet being different from the indicia of other sheets, wherein an operator looking through the aligned aperture and opening can allow eye movement of a patient as the patient's eyes are directed to one of said symbols.

9. The communication aid of claim 8, wherein said symbols on one sheet are different than the symbols on other sheets.

10. The communication aid of claim 8, wherein said symbols are illustrations of objects.

11. The communication aid of claim 8, and including second mounting means for mounting said panel in a generally upright position.

12. The communication aid of claim 5, wherein said identification indicia comprises a colored zone on each sheet, the colored zone on each sheet being of a different color than the colored zone on other sheets.

13. The communication aid of claim 12, wherein each colored zone comprises a colored margin on the sheet.

14. A method of communication, comprising the steps of positioning a plurality of symbols around a central opening in a sheet, mounting said sheet flatwise against a surface of a rigid panel and aligning the opening in said sheet with a central opening in said panel, positioning the aligned openings in alignment with a patient's face, and viewing the eye movement of the patient through the aligned openings as the patient's eyes are directed to one of said symbols to thereby determine the symbol at which the patient's eyes are directed.

15. A communication aid for a handicapped patient, comprising a panel having a central opening therein, a plurality of overlay sheets each having a central aperture therein, mounting means on said panel for individually and removably mounting each sheet in general flatwise relation to the panel with the aperture being aligned with said opening, and a plurality of symbols disposed around the aperture of each sheet, the symbols on one sheet being different than the symbols on the other sheets, wherein with a sheet mounted on said panel an observer looking through the aligned opening and aperture can follow the eyes of the patient to determine the symbol at which the patient's eyes are directed.

* * * * *